April 12, 1927.
P. J. JORGENSEN ET AL
OIL GUN
Filed Nov. 20, 1922
1,624,138
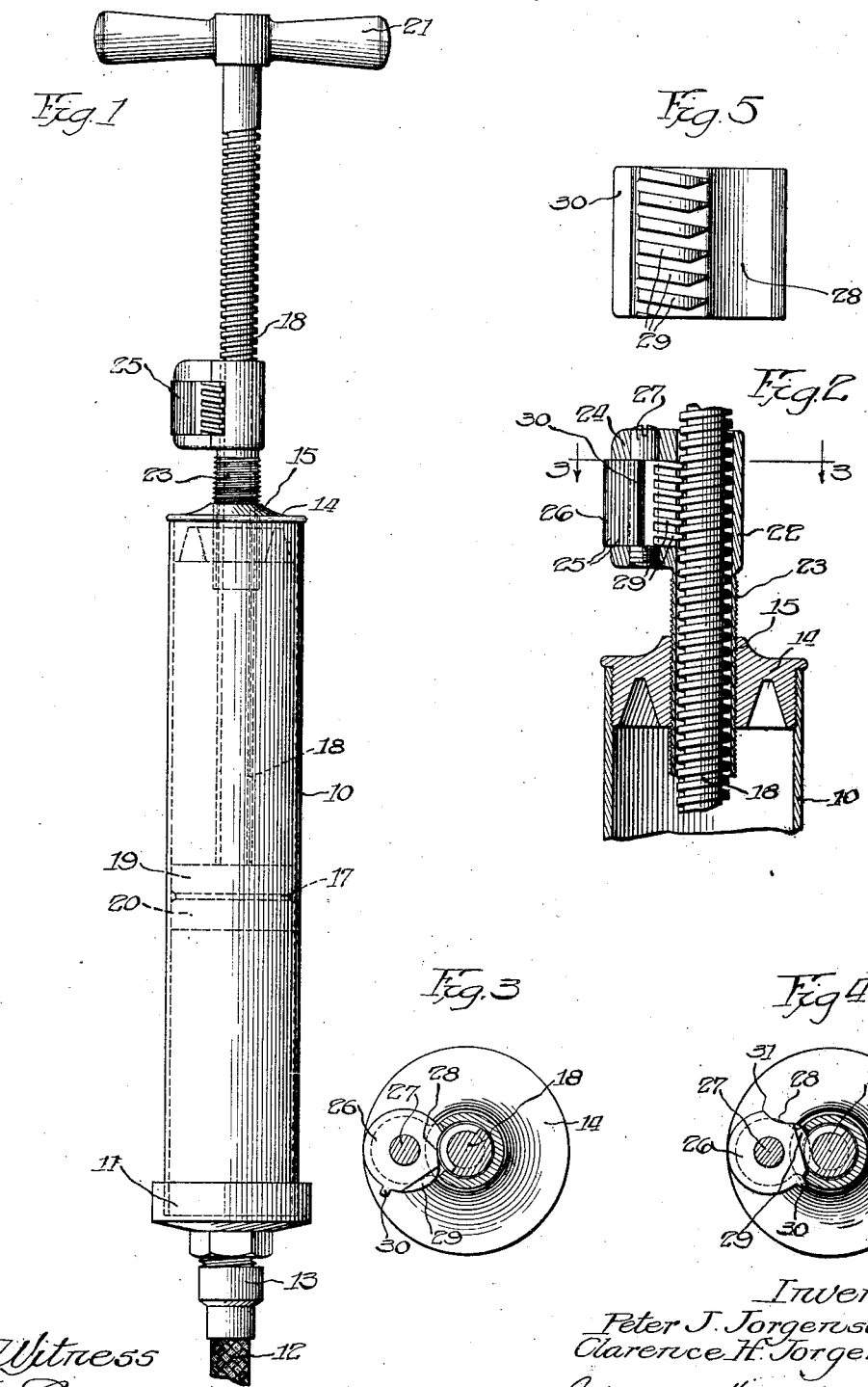
Inventors
Peter J. Jorgensen
Clarence H. Jorgensen Patented Apr. 12, 1927.

1,624,138

UNITED STATES PATENT OFFICE.

PETER J. JORGENSEN AND CLARENCE H. JORGENSEN, OF CHICAGO, ILLINOIS.

OIL GUN.

Application filed November 20, 1922. Serial No. 602,244.

Our invention relates to improvements in oil guns and has particular reference to an oil gun which is easily filled with oil and easily and quickly emptied if desired and from which the contents of the gun are forced into and fill oil cups attached to bearings, particularly cups upon automobile bearings and the like, although it may be used for a like purpose wherever oil containers are used to supply lubricant to bearings.

Another and further object of our invention is the provision of an oil gun having a stem threaded with coarse threads of high pitch for normal operation and which is in engagement with a threaded gland having fine threads with a corresponding flat pitch, thus providing means whereby the pressure range upon the contents of the oil gun is materially increased, running in our improved invention from approximately seven hundred to twenty-four hundred pounds without undue exertion on the part of the operator, this high pressure being particularly desirable when it is desired to flush out a bearing with oil, while the use of the gun with the coarser threads in normal operation enables the operator to fill the oil cups more quickly.

Another and further object of our invention is the provision of an oil gun which is simple in operation and efficient in results and which can be operated quickly and also with a minimum of effort so that the pressure on the contents of the gun can be removed, if desired, quickly without turning the handle backward but a slight distance.

These and other objects of our invention will be more fully and better understood by reference to the accompanying sheet of drawings, in which—

Figure 1 is a vertical elevational view of the improved invention;

Figure 2 is a detail vertical sectional view showing the specific features of the invention;

Figure 3 is a cross-sectional view on line 3—3 of Figure 2 showing the threaded member out of engagement with the threaded stem of the piston;

Figure 4 is a view on the same line as Figure 3 but showing the threaded member in engagement with the threaded stem; and Figure 5 is an enlarged detailed vertical side elevational view of a portion of the rotatable threaded member in the threaded gland.

Referring now specifically to the drawings, in which like reference characters refer to like parts throughout, a cylinder 10 is shown having a lower cylinder cap 11 secured thereto in any approved manner and having connected thereto a flexible outlet hose 12 by means of a nipple 13. A closure cap 14 at the upper end of the cylinder 10 is provided having an internally threaded opening 15 therethrough, the said cap 14 being in threaded engagement with the cylinder or secured thereto in any other approved manner. Mounted within the cylinder 10 is a piston 17 secured to a threaded stem 18, a pair of oppositely disposed suction discs 19 and 20 being provided, which are secured to the head 17, the threaded stem 18 extending out of the cylinder 10 through the opening 15 in the cap 14 and having handle 21 secured to the outer end thereof so that the stem 18 can be turned in either direction or can be reciprocated in the cylinder 10 as hereinafter described.

A tubular member 22 is provided through which the threaded stem 18 extends, the said member 22 having a lower externally threaded portion 23 in threaded engagement with the end cap 14, the cooperating threads of these parts being extremely fine; through their use a maximum pressure is obtained upon the contents of the cylinder 10. The member 22 has an enlarged portion 24 at its upper end, upon one side of which is a recess 25 within which is mounted a partially rotatable member 26 upon a vertically extending pin 27, which is threaded at its lower end and is in engagement with the enlarged portion 24 of the member 22 so that the member 26 is held in position. Upon one side of the member 26 is a longitudinally extending arcuate-shaped recess 28, the inner surface of which conforms to and is adjacent to the tops of the threads upon the stem 18, while immediately adjacent to the recess 28 is a plurality of threads 29—29 upon the side of the member 26, which are adapted, when the member 26 is turned properly, to engage the threads upon the stem 18, the threads 29—29 being slightly flattened at their outer lower edges, as shown in Figure 5, so as to easily position themselves in the valleys of the threads upon the stem 18. A stop 30 is provided upon the member 26 to prevent its being turned too far, while adjacent to the recess 28 is a shoulder 31 which prevents the member 26 from being turned too far in the opposite direction.

It will be understood that this device is primarily intended to be used with oil or other suitable lubricant, and when it is desired to fill the cylinder 10 with oil, the end of the outlet pipe 12 is placed in a receptacle containing oil, the member 26 is disengaged from the stem 18 by turning the same partially around until the recess 28 is adjacent to the stem 18, thus disengaging the threads upon these two members, this operation being performed usually by the thumb of the operator while grasping the cylinder 10 at its upper end, and the plunger 17 is then pulled upward, filling the cylinder 10 with oil. A suitable oil cup connecting means, such as described in our copending application Serial No. 508,367, filed October 17, 1921, is secured to the end of the outlet pipe 12 and prevents the oil from leaking out of the cylinder 10 until a valve is opened in said connecting means, usually by a projecting intake pipe attached to the oil cup, and thereupon pressure is applied to the contents of the cylinder 10 by turning the plunger 17 down upon the oil, or, if desired, the member 26 can be turned so that the threads are out of engagement and cylinder 10 emptied very quickly by pushing plunger 17 down to the bottom of cylinder 10, thus forcing all of the oil from the cylinder 10. The member 22 is normally retained in the position shown in Figure 1, and if, during the turning down of the stem 18, the oil cup is stopped up or it is desired to flush out a particularly tight fitting bearing and the pressure increases, the friction increase between the threads on the stem 18 and the member 26 overcomes the frictional resistance of the threads on the member 22 so that this portion moves into the threaded cup 14, which because of the finer threads enables the operator to apply pressure three or four times in excess of what would be possible in the normal operation of the device with the same amount of exertion.

It will be understood that this device is primarily adapted to fill oil cups secured to the bearings of automobiles and that when not in use it would probably not be desirable to retain oil in the cylinder, and by our improved invention the cylinder can be very quickly filled and emptied of oil and the device can be changed very quickly so as to apply a pressure upon the oil for the purpose of filling oil cups or for flushing out bearings and the like.

While we have described more or less precisely the details of construction, we do not wish to be understood as limiting ourselves thereto, as we contemplate changes in form and the proportion of parts and the substitution of equivalents as circumstances may suggest or render expedient without departing from the spirit or scope of our invention.

We claim:

1. An oil gun comprising in combination a cylinder having a discharge port at one of its ends, an end closure member, an externally threaded gland in engagement with said closure member, a piston in said cylinder having an externally threaded stem and means carried by said gland member adapted to be brought into and out of engagement with the threads on the said stem, the said gland having threads of lesser pitch than the threads on the said stem.

2. An oil gun comprising in combination a cylinder having a discharge port at one of its ends, an end closure member, an externally threaded gland in engagement with said closure member, a piston in said cylinder having an externally threaded stem and a threaded member carried by said gland member adapted to be brought into and out of engagement with the threads on the said stem, the said gland having threads of lesser pitch than the threads on the said stem.

3. An oil gun comprising in combination a cylinder having a discharge port, an end closure member on said cylinder, an externally threaded gland member in engagement with said closure member, a plunger in said cylinder having an externally threaded stem, a rotatable threaded member mounted upon said gland member and adapted to be turned into and out of engagement with said threaded stem, the external threads on said gland member having a slight pitch and the threads on said stem having a greater pitch than the threads on the said gland.

4. An oil gun comprising in combination, a cylinder having a discharge port, an end closure member, an externally threaded gland member in engagement with said closure member, a plunger in said cylinder having an externally threaded stem, and a rotatable member mounted upon said gland member adapted to be turned into engagement with said threaded stem or to be turned out of engagement therewith, the threads on said gland member being of lesser pitch than the threads on said stem, and the said rotatable member having threads upon one of its sides only.

Signed at Chicago, Illinois, this 15th day of November, 1922.

PETER J. JORGENSEN.
CLARENCE H. JORGENSEN.